United States Patent
Ahn et al.

(10) Patent No.: US 8,537,677 B2
(45) Date of Patent: Sep. 17, 2013

(54) INCREMENTAL ADAPTIVE PACKET ROUTING IN A MULTI-DIMENSIONAL NETWORK

(75) Inventors: Jung Ho Ahn, Seoul (KR); Nathan Binkert, Redwood City, CA (US); Al Davis, Coalville, UT (US); Moray McLaren, Bristol (GB); Robert Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 12/577,972

(22) Filed: Oct. 13, 2009

(65) Prior Publication Data

US 2011/0085561 A1    Apr. 14, 2011

(51) Int. Cl.
*H04L 12/56*    (2006.01)

(52) U.S. Cl.
USPC .......................................... 370/232; 370/238

(58) Field of Classification Search
None
See application file for complete search history.

(56) References Cited

U.S. PATENT DOCUMENTS

| | | | | |
|---|---|---|---|---|
| 5,577,030 | A * | 11/1996 | Oki et al. | 370/351 |
| 5,583,860 | A * | 12/1996 | Iwakawa et al. | 370/232 |
| 5,812,524 | A * | 9/1998 | Moran et al. | 370/228 |
| 7,047,316 | B2 * | 5/2006 | Iwata et al. | 709/240 |
| 7,388,869 | B2 * | 6/2008 | Butehorn et al. | 370/401 |
| 7,633,940 | B1 * | 12/2009 | Singh et al. | 370/389 |
| 7,856,001 | B2 * | 12/2010 | Hares et al. | 370/338 |
| 8,274,893 | B2 * | 9/2012 | Bansal et al. | 370/235 |
| 2002/0049855 | A1 * | 4/2002 | Porotsky | 709/238 |
| 2003/0193901 | A1 * | 10/2003 | Ishibashi | 370/252 |
| 2004/0218595 | A1 * | 11/2004 | Acharya et al. | 370/389 |
| 2005/0144394 | A1 * | 6/2005 | Komarla et al. | 711/137 |
| 2010/0128629 | A1 * | 5/2010 | Sinha et al. | 370/253 |

OTHER PUBLICATIONS

Kim, John, "Flattened Butterfly: A Cost-Efficient Topology for High-Radix Networks", ISCA '07, Jun. 9-13, 2007.

* cited by examiner

*Primary Examiner* — Bunjob Jaroenchonwanit (57) ABSTRACT

Illustrated is a computer system and method that includes a Processing Element (PE) to generate a data packet that is routed along a shortest path that includes a plurality of routers in a multiple dimension network. The system and method further include a router, of the plurality of routers, to de-route the data packet from the shortest path to an additional path, the de-route to occur where the shortest path is congested and the additional path links the router and an additional router in a dimension of the multiple dimension network.

19 Claims, 10 Drawing Sheets

INCREMENTAL ADAPTIVE PACKET ROUTING IN A MULTI-DIMENSIONAL NETWORK

BACKGROUND

Large scale parallel computing systems comprise a large number of Processing Elements (PEs) which communicate via an interconnect system. The performance of these computing systems is influenced by both the performance of the interconnect and the performance and number of the interconnected PEs. An individual PE consists of one or more processors, memory, inter-connect interfaces, and may be physically implemented as a chip, board, or collection of boards, blade, rack, or a cluster of racks. Optionally, a PE may also contain secondary disk storage, and additional Input-Output (I/O) interfaces to additional general-purpose networks.

The interconnect system consists of a set of routers or switches connected by electrical or optical links. Each link connects a router to another router or to a PE which is viewed as a terminal node of the interconnect system. Terminal nodes are sources or destinations for communication packets and routers are responsible for successfully routing packets from source to destination PEs. The performance of the interconnect system depends on three components: the topology, the switch, and the routing algorithm that is implemented in the switch. Many routing algorithms are dependent upon the topology choice, and most switch architectures are dependent on both the topology and the routing algorithm choices.

Numerous topologies and routing algorithms have been proposed in the literature. Example topologies are two dimensional (2D) or three dimensional (3D) meshes, crossbars, multi-stage networks (e.g., the butterfly, banyan, or Benes networks), Clos, folded-Clos, and flattened butterfly.

Routing algorithms can be classified into three classes. Deterministic routers choose a fixed route between any source-destination pair. Oblivious routers choose paths dynamically, but the choice is not based on network load. Adaptive routers choose a path based on network load in an attempt to improve performance by dynamically avoiding congested links or switches.

Additional important routing considerations are deadlock avoidance, minimizing path lengths or hops, and whether or not packets from a single source are delivered to the destination in the order in which they were sent. Adaptive routing algorithms inherently do not guarantee in-order packet delivery and hence an additional burden is placed on the destination PE to reorder packets based on packet sequence tags that are contained in the packet.

BRIEF DESCRIPTION OF THE DRAWINGS

Some embodiments of the invention are described, by way of example, with respect to the following figures.

DETAILED DESCRIPTION

Illustrated is a system and method for an adaptive routing algorithm called DAL which is optimized for high dimension symmetric network topologies such as HyperX. A HyperX network is a symmetric generalization of the class of interconnection topologies known as flattened butterfly networks, where routers in the network are all-to-all connected in each dimension in a multiple dimension topology. A router, as used herein, is a device that determines the route or direction a data packet is to take in a network. A dimension, as used herein, includes a set of routers that are connected, where connected means there is at least one path between every distinct pair of routers in the set of routers. In one example embodiment of this system and method, a data packet is routed along a de-routed path from a shortest path between a source and destination, when this shortest path is congested. As used herein, the de-routing of a packet includes sending the packet along a not-shortest-possible path towards the packet's destination.

In some example embodiments, a HyperX network includes routers having a regular interconnection topology in which each router is connected to some fixed number of "PEs." An example of a regular interconnect topology is a topology that includes PEs on a board, a plurality boards in a rail, and a plurality of rails in a rack. The topology of a HyperX is as follows. Routers are thought of or identified with points in an L-dimensional integer lattice. Each router is identified by a coordinate vector, or multi-index $I=(I_1 \ldots I_L)$, where $0 \leq I_k < S_k$ for each $k=1 \ldots L$. In each dimension, the routers are fully connected such that there are bidirectional links from each router to exactly $\Sigma_{K=1}^{L}(S_k-1)$ other routers. A router connects to all other routers whose multi-index is the same in all but one coordinate.

In some example embodiments, the HyperX network is constructed from these connected routers, where the routers have a fixed radix "R." As used herein, a radix is a port on a router. R is an upper bound on the number of links per router such that:

$$R \geq T + \Sigma_k(S_k-1)$$

Assuming the building of a network with a fixed collection of "N" PE nodes, there are at least this many links to terminals.

With a total of $\Pi_{k=1}^{L}$ Sk routers, each having "T" terminal links, this constraint becomes:

$$N \leq T(\Pi_{k=1}^{L} Sk)$$

Note that with both R and N viewed as given, fixed constants, these equations provide both an upper bound (1) and a lower bound (2) on T for each possible network shape "S." The design space can be simplified by assuming that $S_k=S$, for all k=1 ... L; and all dimensions are equal. Further, for each possible dimension $L \geq 1$, the bounds on T depend on the scalar of S, and the integer triples (L, S, and T) for which T lies between these bounding curves as feasible designs.

Some example embodiments include a HyperX with all links having uniform bandwidth. The HyperX topology can be further generalized by allowing the link bandwidths to be multiples of some unit of bandwidth, to model the option of trunking of multiple physical layer links. This flexibility can be exploited to provide uniform bandwidth between dimensions with different values of S, and to allow different bandwidths between terminal and intra-switch links. In some example embodiments, a system and method for DAL is illustrated for routing data packets between routers in a HyperX network. Each router in the HyperX network may use a de-routed or non-minimal path to avoid network congestion. A de-routing path, as used herein, means a path other than the shortest path between two routers. A shortest path may be determined by applying Dijkstra's algorithm, the Floyd-Warshall algorithm, the Bellman-Ford algorithm, or some other suitable algorithm to a network. Examples of congestion include a broken link, a link whose bandwidth usage has exceeded a bandwidth parameter, a blocked link, or some other impediment to the flow of data packets across a path. Constraints on utilizing a de-routed path are that the de-route selection cannot cause an aligned dimension to become unaligned, and at most one de-route per dimension can be performed. When both the router holding a packet and the destination router have multi-index values that are equal in position k, then dimension k is defined as being aligned. As will be discussed in more detail below, DAL's decision as to whether to use a de-routed path versus a shortest path can be incrementally made at each hop and is dynamically determined based on available path congestion.

Figure 1:
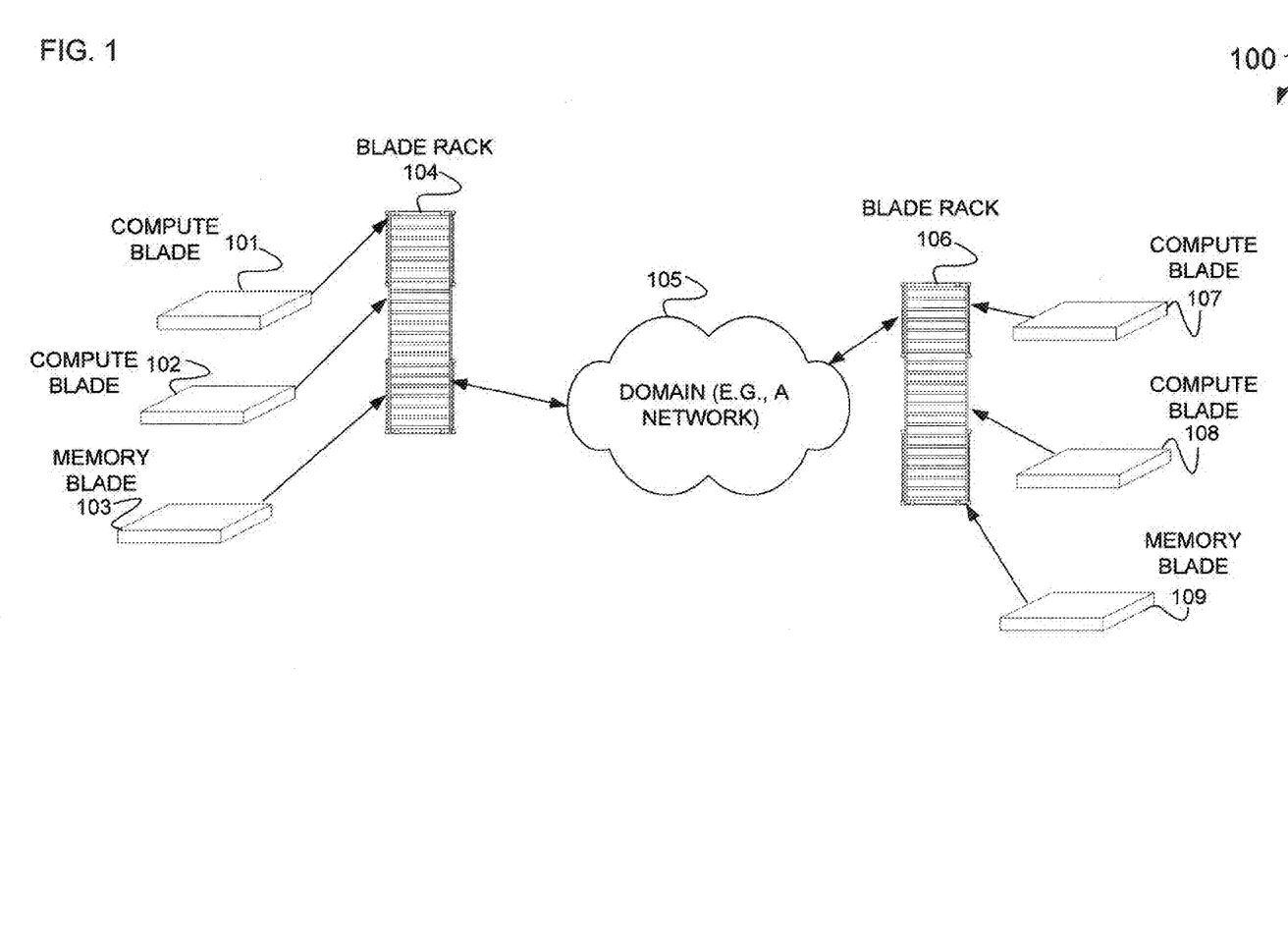
FIG. 1 is a diagram illustrating a system, according to an example embodiment, that implements Dimensionally-Adaptive Load-Balancing (DAL).

FIG. 1 is a diagram illustrating an example system 100 that implements DAL. Shown are example compute blades 101-102, and a memory blade 103 that are included as part of the blade rack 104. Further, a blade rack 106 is shown that includes compute blades 107-108, and a memory blade 109. A compute blade, as referenced herein, is a computer system with memory to read input commands and data, and a processor to perform commands manipulating that data. A memory blade, as referenced herein, is network attached storage that includes a plurality a storage media (e.g., magnetic or optical storage) managed by a processor. The blade racks 104 and 106 are operatively connected to a domain 105. Operatively connected, as used herein, includes a logical or physical connection. The domain 105 is a network and includes a Local Area Network (LAN), a Wide Area Network (WAN), or some other suitable type network and associated topology such as HyperX. In some example embodiments, a computer system in the form of a computing cluster, or other suitable computer system, is implemented in lieu of the blade rack 104 and blade rack 106. This computing cluster implements the systems and methods illustrated herein. As will be more fully illustrated below, PEs and/or routers are implemented on one or more of the compute blades 101-102, 107-108, and memory blade 103 and 109 that route data packets between the PEs.

Figure 2:
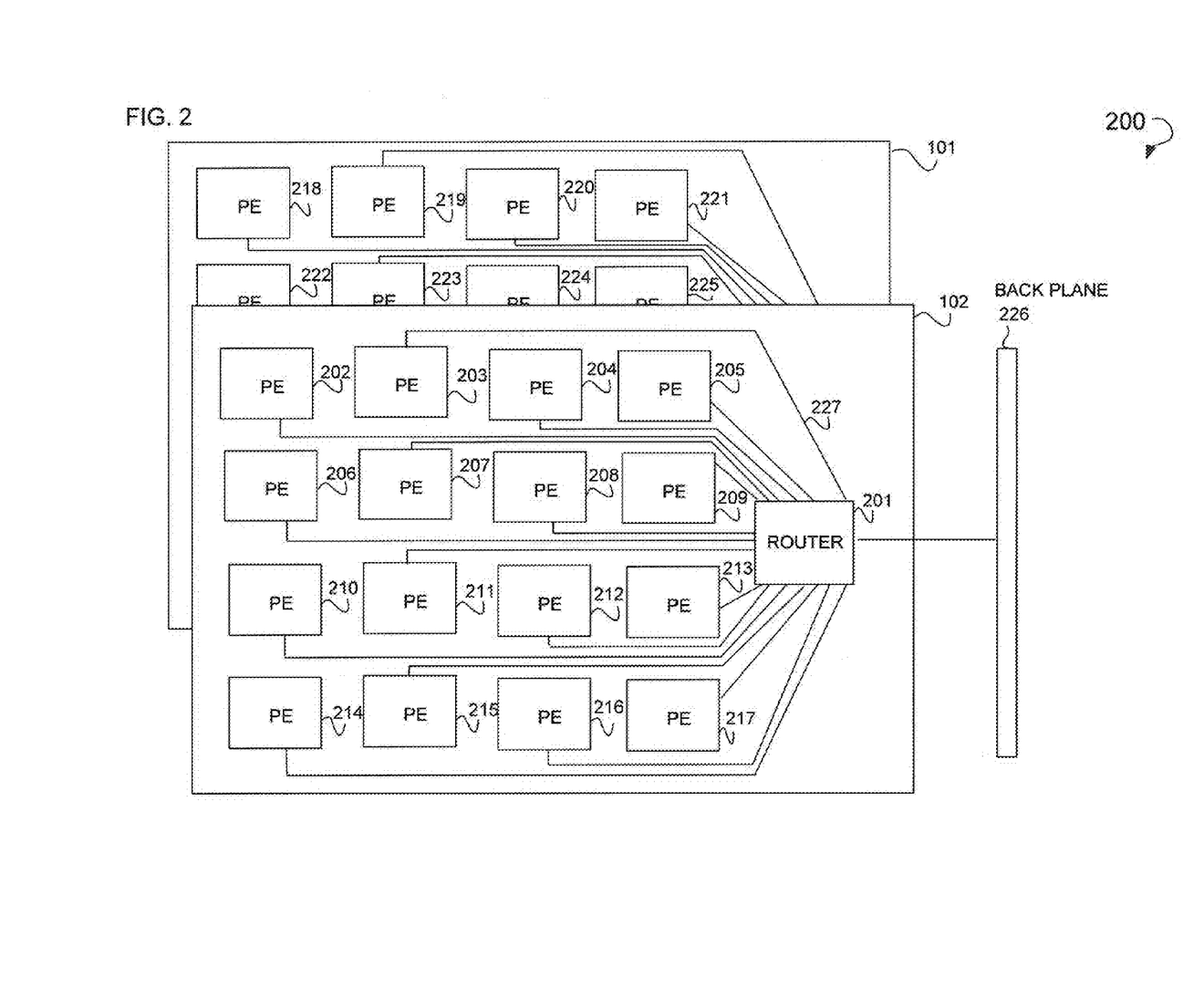
FIG. 2 is a diagram of a system, according to an example embodiment, illustrating the routers and PEs that can be organized into a HyperX network.

FIG. 2 is a diagram of an example system 200 illustrating the routers and PEs that can be organized into a HyperX network. Shown is a compute blade 101 that includes PEs 218-225. Also shown is a compute blade 102 that includes PEs 202-217. These various PEs 202-217 are connected via a plurality of communication channel(s) 227. The communication channel(s) 227 is a point-to-point electronics or photonics based communication channel. This communication channel(s) 227 operatively connects the PEs 202-217 to a router 201. This router 201 is used to route data packets from one or more of the PEs 202-217 to a additional router(s) residing on, for example, the compute blade 101. This routing is performed through a backplane 226 associated with the blade rack 104. Further, this router 201 may be used to route data packets between the PE 202-217. As will be illustrated below, the various PEs 202-217 and 218-225 may be organized into a topology that includes a HyperX network.

Figure 3:
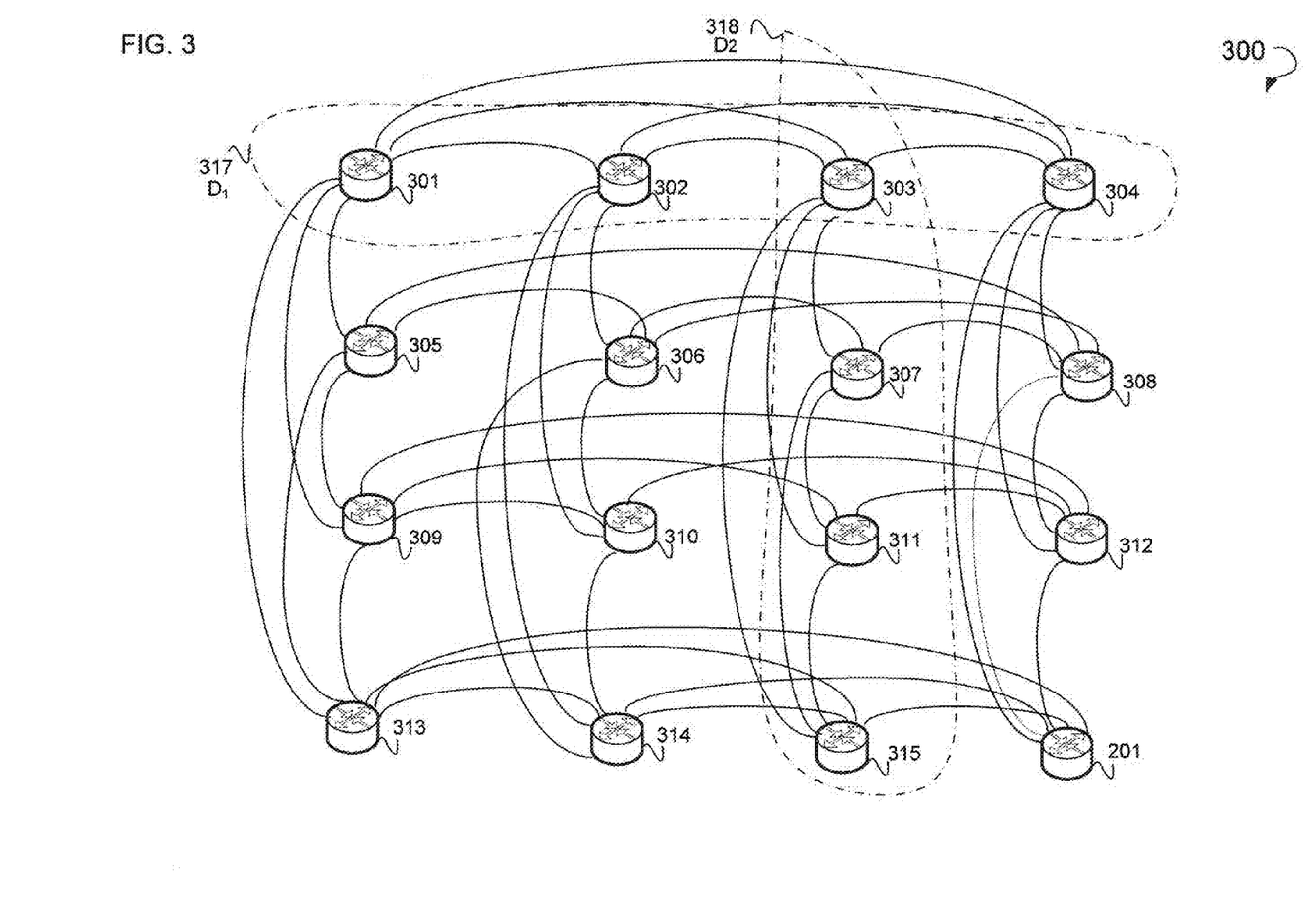
FIG. 3 is a diagram of a system, according to an example embodiment, illustrating the logical view of various routers or switches organized into a two-dimensional four-by-four (4:4) HyperX network.

FIG. 3 is a diagram of an example system 300 illustrating the logic view of various routers organized into a two-dimensional four-by-four (4:4) HyperX network. Specifically, in a two-dimensional 4:4 HyperX, each dimension has four (4) members and each member includes four routers. For example, as illustrated, the first dimension includes four members, with a first of the four members referenced at $D_1$ 317. $D_1$ 317 includes routers 301-304. Additional members of the first dimension include routers 305-308, 309-312, and routers 313-315 and router 201. A second dimension is illustrated, where the second dimension includes four (4) members. A first member of this second dimension is illustrated at $D_2$ 318, and includes routers 303, 307, 311, and 315. Additional member of this second dimension include routers 201, 312, 308, and 304, routers 314, 310, 306, and 302, and routers 313, 309, 305, and 301. Each link between each router is bidirectional.

Figure 4:
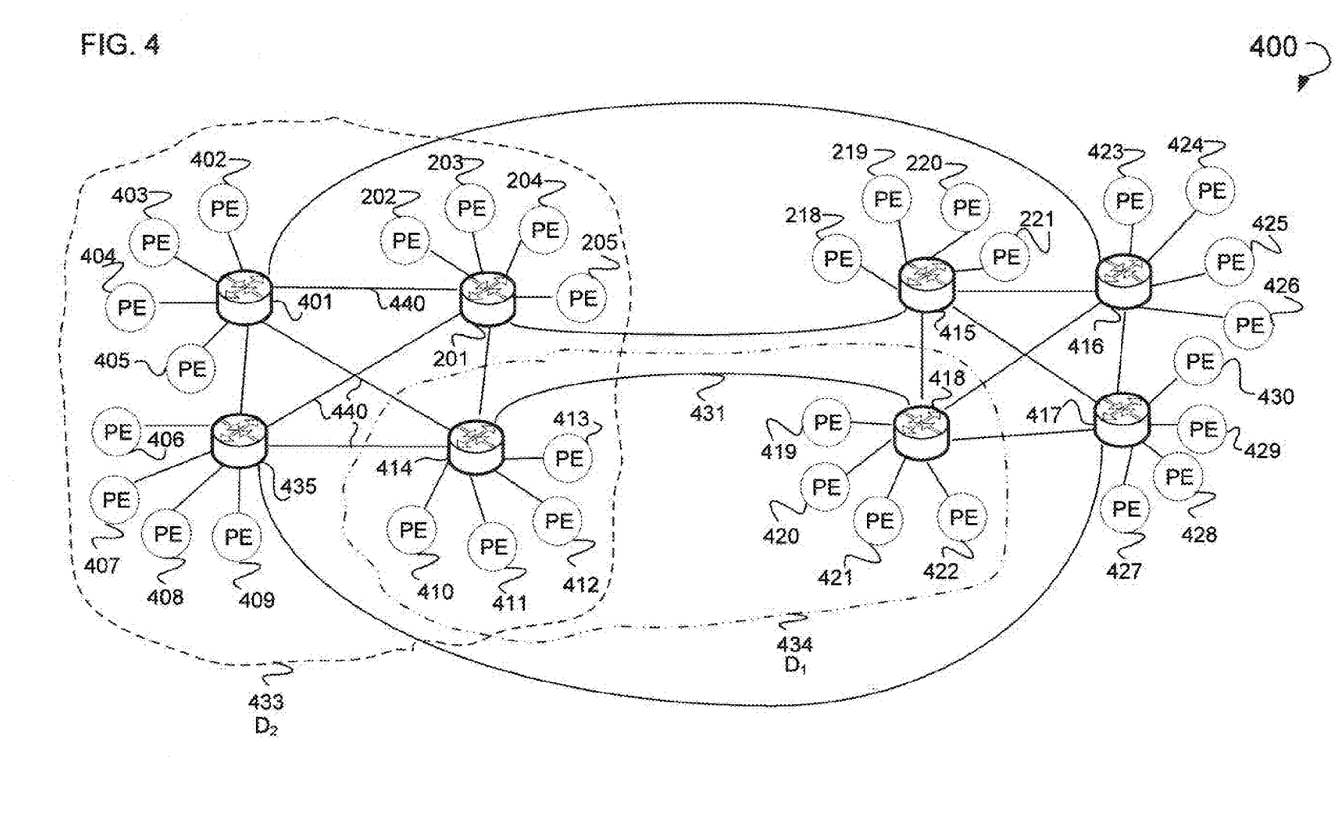
FIG. 4 is a diagram of a system, according to an example embodiment, illustrating the logical view of various PEs and routers organized into a two-dimensional four-by-two (4:2) HyperX network.

FIG. 4 is a diagram of example system 400 illustrating the logical view of various PEs and routers organized into a two-dimensional four-by-two (4:2) HyperX network. Specifically, in a two-dimensional 4:2 HyperX, the first dimension has four (4) members and each member includes two routers. Further, the second dimension has two (2) members and each member has four routers. Illustrated is a first member of the first dimension, the first member referenced at $D_1$ 434, and including routers 414 and 418. Routers 414 and 418 are operatively connected via a path 431. Additional members of the first dimension are router pairs 201 and 415, 401 and 416, and 435 and 417. The members of the first dimension are connected such that there is one path between every two distinct routers in each pair. Moreover, operatively connected to the router 414 are PEs 410-413. Operatively connected to routers 418 are PEs 419-422. Operatively connected to router 201 are PEs 202-205, operatively connected to the router 415 are PEs 218-221. Operatively connected to the router 401 are PEs 402-405, and operatively connected to router 416 are PEs 423-426. Operatively connected to the router 435 are PEs 406-409, and operatively connected to router 417 is PE 427-430. Also shown, is a first member of the second dimension, the first member referenced at $D_2$ 433. $D_2$ 433 includes routers 201, 401, 414, and 435. The paths within $D_2$ 433 are illustrated at 440. The members of the second dimension are connected such that there is one path between every two distinct routers in each pair. A second member of the first dimension includes routers 415-418.

Figure 5:
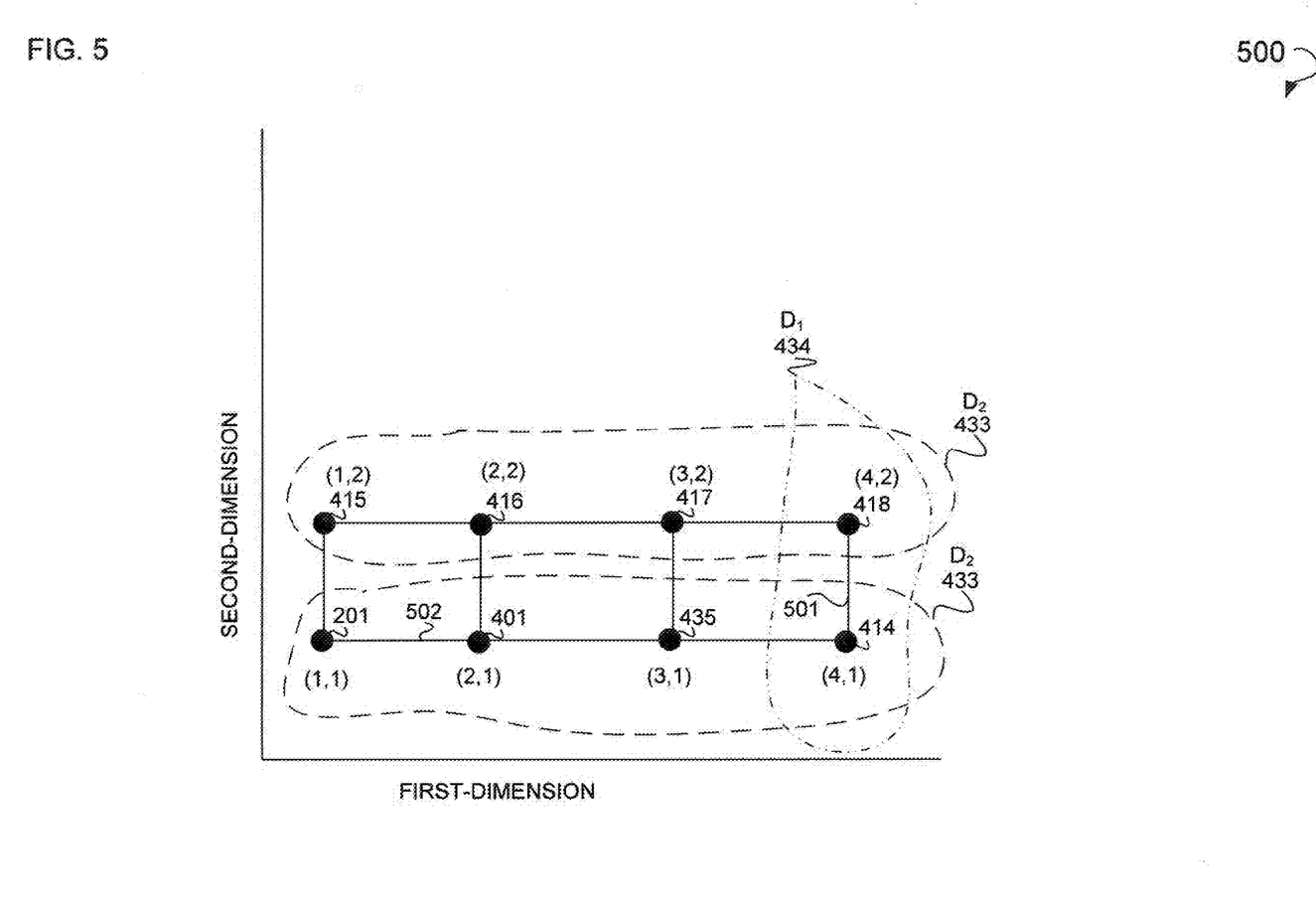
FIG. 5 is a diagram of a rectangular coordinate system, according to an example embodiment, illustrating a logical view of the previously illustrated 4:2 HyperX network with routers as points on the system.

FIG. 5 is a diagram of an example rectangular coordinate system 500 illustrating a logical view of the previously illustrated 4:2 HyperX network with routers as points on the system. Illustrated is $D_1$ 434 that reflects an first-dimension alignment, where router 414 has the coordinates (4,1), and the router 418 has the coordinates (4,2). Other routers with a first-dimension alignment that are part of $D_1$ 434 include router pairs 435 (with coordinates (3,1)) and 417 (with coordinates (3,2)), 401 (with coordinates (2,1)) and 416 (with coordinates (2,2)), and 201 (with coordinates (1,1)) and 415 (with coordinates (1,2)). One path, referenced as 501, exists between every two distinct router in $D_1$ 434. Also shown is a $D_2$ 433 that reflects a second-dimension alignment amongst the previously illustrated routers, 201, 401, 435, and 414, and routers 415, 416, 417, and 418. Specifically, routers 201, 401, 435, and 414 have the following respective coordinates of (1,1), (2,1), (3,1), and (4,1). Routers 415, 416, 417, and 418 have the coordinates of (1,2), (2,2), (3,2), and (4,2). Routers 201, 401, 435, and 414 have one path, referenced at 502, between every two distinct router in $D_2$ 433.

In some example embodiments, traversal of the HyperX network shown in FIG. 5 is performed using DAL. As discussed above, a traversal of the HyperX network using DAL includes de-routing only within a dimension, and only within a predefined threshold value. A predefined threshold value may be at most one time within a dimension or refers to a wait period where the DAL router continues to try for a shortest path prior to a de-route decision. A traversal of the HyperX network in FIG. 5 from the source router 201 to the destination router 417 may use DAL, where the shortest path between the router 201 and 417 is congested. Specifically, if the shortest path is 201→435→417, or 201→415→417 and both of these paths are congested, then DAL may be implemented such that the de-routed path is 201→415→416→417. This de-routed path de-routes once within $D_1$ 433 by routing through 416. Of note, DAL is applied at each hop within the HyperX network based upon the possibility of congestion observed at each hop.

Figure 6:
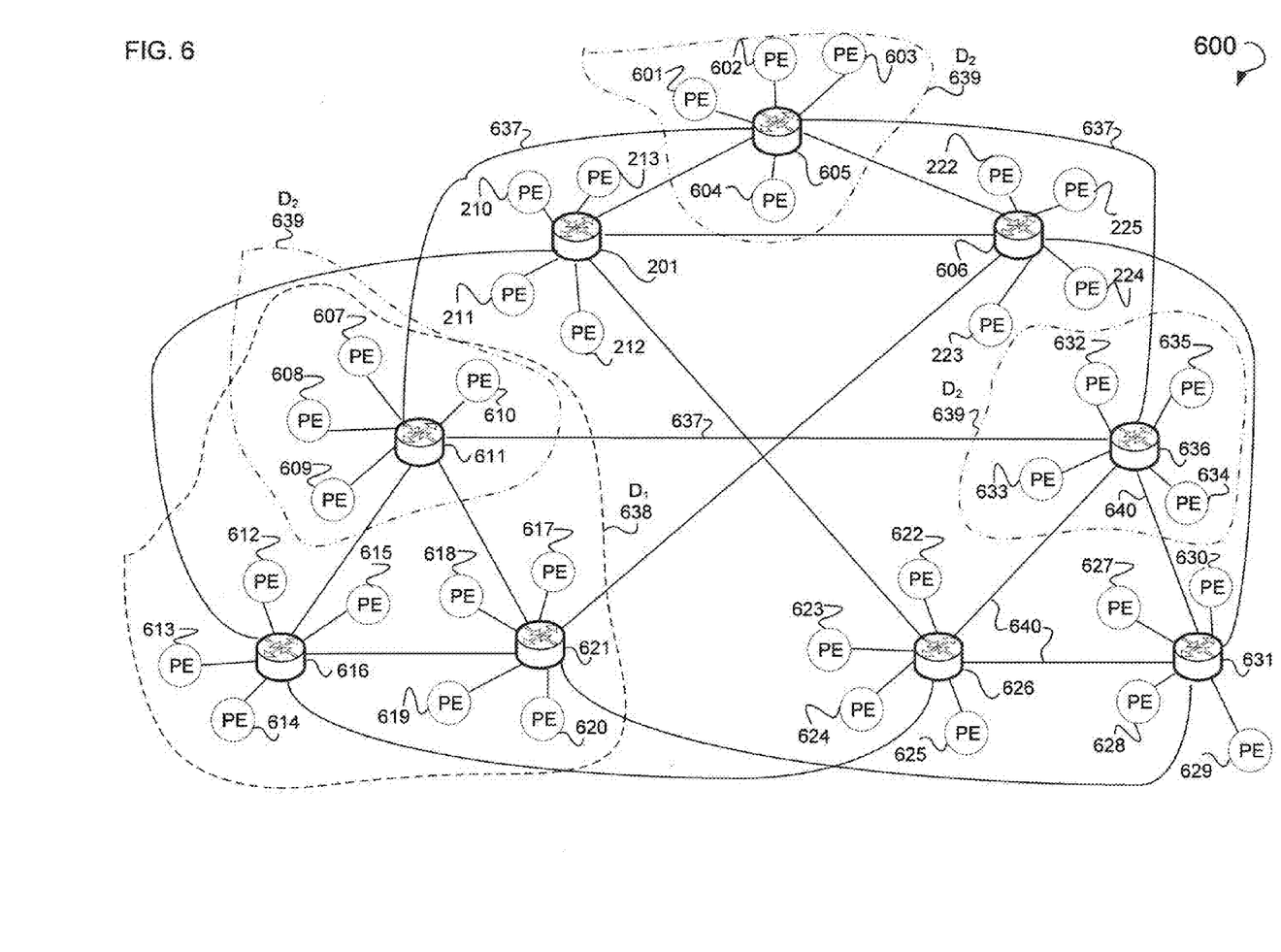
FIG. 6 is a diagram of a system, according to an example embodiment, illustrating the logical view of various PEs and routers organized into a two-dimensional three-by-three (3:3) HyperX network.

FIG. 6 is a diagram of example system 600 illustrating the logical view of various PEs and routers organized into a two-dimensional three-by-three (3:3) HyperX network. Specifically, in a two-dimensional 3:3 HyperX, the first dimension has three (3) members and each member includes three routers. Further, the second dimension has three (3) members and each member has three routers. Illustrated is a first member of the first dimension referenced at $D_1$ 638. This first dimension includes the router 611, 621 and 616. Operatively connected to the router 611 are PEs 607-610. Operatively connected to the router 621 are PEs 617-620. Operatively connected to the router 616 are PEs 612-615. Also included in the first dimension is a second member including routers 636, 631 and 626. Operatively connected to router 636 are PEs 632-635. Operatively connected to router 631 are PEs 627-630. Operatively connected to router 626 are PEs 622-625. Further, included in the first dimension is a third member that includes routers 605, 201, and 606. Operatively connected to the router 201 are PEs 210-213. Operatively connected to router 605 are PEs 601-604. Operatively connected to router 606 are PEs 222-225. Shown is a second dimension that includes members referenced at $D_2$ 639. A first member of the second dimension includes routers 611, 605, and 636 that are connected by the path 637. A second member of the second dimension includes routers 201, 616, and 626. Operatively connected to router 616 are PEs 612-615. Operatively connected to router 626 are PEs 622-625. A third member of the second dimension includes routers 606, 621, and 631.

Figure 7:
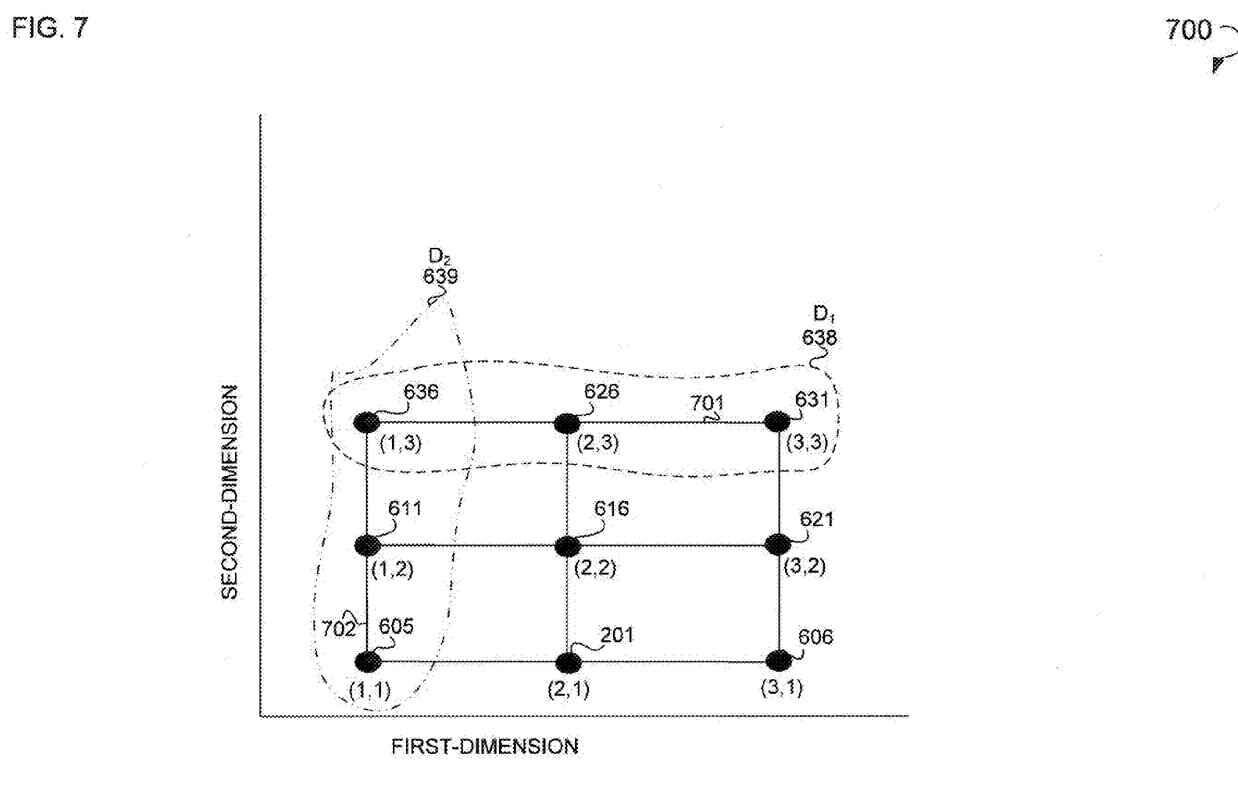
FIG. 7 is a diagram of a rectangular coordinate system, according to an example embodiment, illustrating a logical view of the previously illustrated 3:3 HyperX network with routers as points on the system.

FIG. 7 is a diagram of an example rectangular coordinate system 700 illustrating a logical view of the previously illustrated 3:3 HyperX network with routers as points on the system. Shown are the previously illustrated members of the first dimension align in an first-dimension. Specifically, routers, 605, 611, and 636 have the coordinates (1,2), (1,2), and (1,3). Additionally, routers 201, 616, and 626 have coordinates (2,1), (2,2), and (2,3). Routers 606, 621, and 631 have coordinates (3,1), (3,2) and (3,3). One path, referenced at 702, exists between every two distinct router in $D_2$ 639. The previously shown members of the second dimension align in a second-dimension. Namely, routers 636, 626, and 631 have the following respective coordinates of (1,3), (2,3), and (3,3). Routers 611, 616, and 621 are also aligned in the same second-dimension and have the respective coordinates of (1,2), (2,2), and (3,2). Router 605, 201, and 606 are aligned in the same second-dimension and include the coordinates of (1,1), (2,1), and (3,1). One path, referenced at 701, exists between every two distinct router in $D_1$ 638.

In some example embodiments, traversal of HyperX network shown in FIG. 7 is performed using DAL. As discussed above, a traversal of the HyperX network using DAL includes de-routing only within a dimension, and only within a predefined threshold. A predefined threshold may be at most one time within a dimension or a designated time threshold that must proceed a de-route decision. For example, a traversal of the HyperX network in FIG. 7 from the source router 605 to the destination router 631 may use DAL, where the shortest path between the router 605 and 631 is congested. Specifically, if the shortest path is 605→606→631, or 605→636→631 and both of these paths are congested, then DAL may be implemented such that the de-routed path is 605→611→636→626→631. This de-routed path de-routes once within $D_2$ 639 by routing through 611, and once within $D_1$ 638 by routing through 626. Of note, DAL is applied at each hop within the HyperX network based upon the possibility of congestion existing at each hop.

Figure 8:
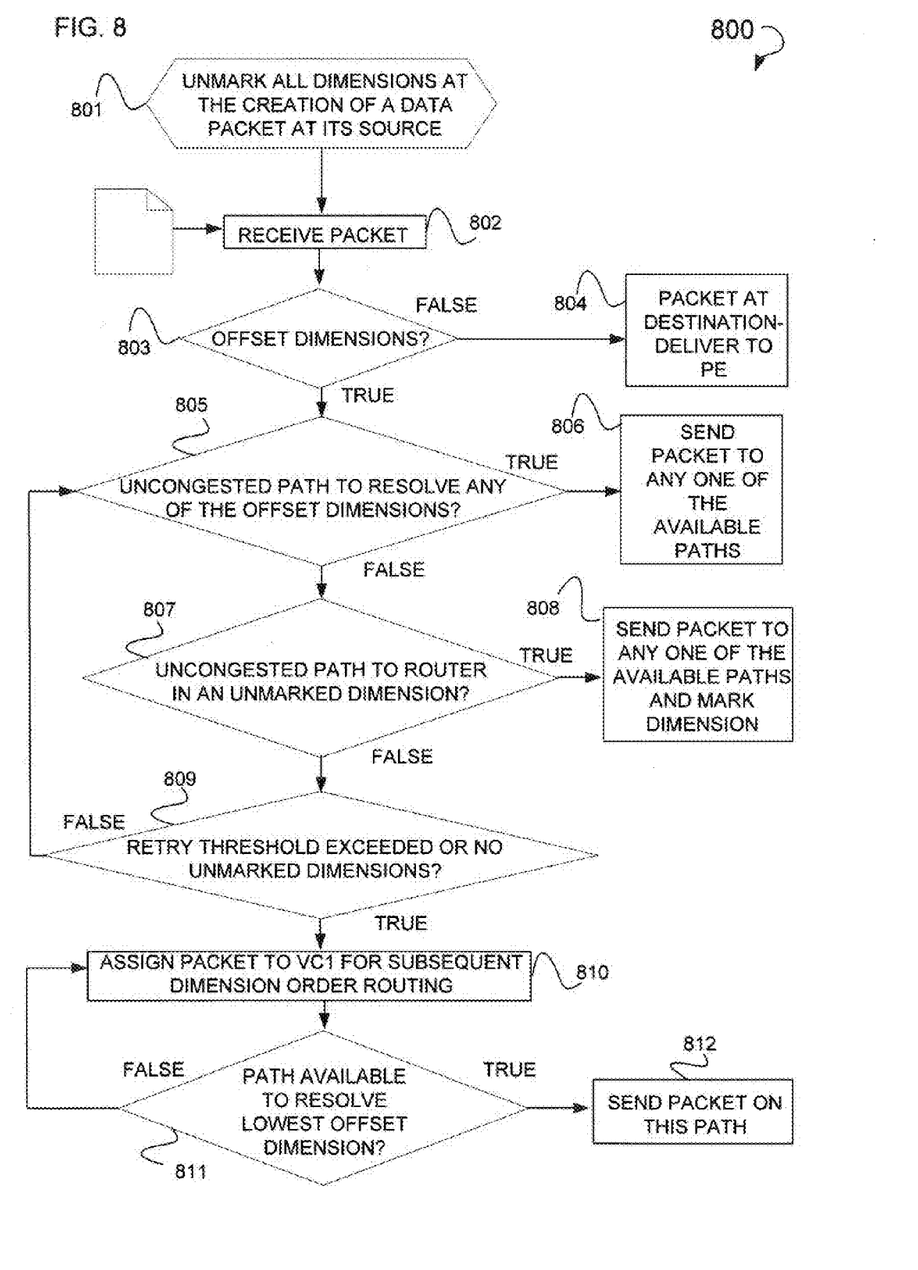
FIG. 8 is a flowchart illustrating a method, according to an example embodiment used to implement DAL.

FIG. 8 is a flowchart illustrating an example method 800 used to implement DAL. This method 800 may be performed by the router 201. Operation 801 is executed to unmark all dimensions at the creation of a data packet at its source. These dimensions may be represented within a data structure. Operation 802 is executed to receive a data packet. Decisional operation 803 is executed to determine whether offset dimensions are available in the path to the destination device. In cases where decisional operation 803 evaluates to "false," operation 804 is executed. Operation 804 delivers the data packet to the destination device (e.g., a router or PE). In cases where decisional operation 803 evaluates to "true," decisional operation 805 is executed. Decisional operation 805 determines whether an uncongested link that is on a shortest path exists to resolve any of the offset dimensions. In cases where decisional operation 805 evaluates to "true," an operation 806 is executed. Operation 806 sends the data packet on the available link that is on a shortest path. Where decisional operation 805 evaluates to "false," decisional operation 807 is executed. Decisional operation 807 determines an uncongested link to a router in an unmarked dimension. In cases where decisional operation 807 evaluates to "true." operation 808 is executed. Operation 808 sends the data packet to any one of the available links and marks the dimension (e.g., records in a data structure that a de-route has occurred). Where decisional operation 807 evaluates to "false," decisional operation 809 is executed. Decisional operation 809 determines whether the threshold value (e.g., the predefined threshold value) has been exceeded, or whether there are no unmarked dimensions remaining in the data structure. This threshold value may be set based upon considerations including livelock, deadlock, or computer system resource starvation. In cases where decisional operation 809 evaluates to "false;" decisional operation 805 is re-executed. In cases where decisional operation 809 evaluates to "true," operation 810 is executed. Operation 810, when executed, assigns a data packet to a queue for shortest deterministic path routing (e.g., referenced herein as subsequent dimension order routing). Decisional operation 811 is executed to determine whether there is a path available to resolve lowest offset dimension. In cases where decisional operation 811 evaluates to "false," operation 810 is executed. In cases where decisional operation 811 evaluates to "true," operation 812 is executed. Operation 812, when executed, sends the data packet on this path that resolves the lowest offset dimension.

Figure 9:
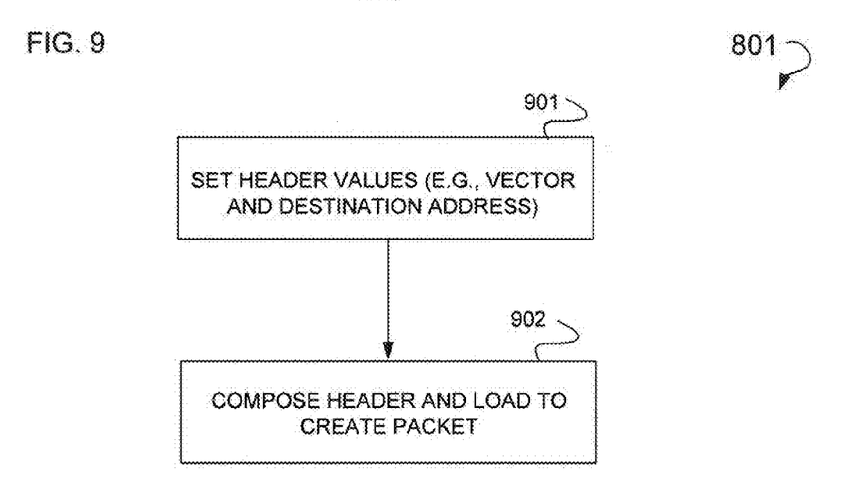
FIG. 9 is a flow chart illustrating the execution of operation, according to an example embodiment, to unmark all dimensions at the creation of a data packet at its source.

FIG. 9 is a flow chart illustrating the execution of operation 801. Shown is an operation 901 that is executed to set header values for a data packet. These header values may include: an N-bit vector for an N dimensional HyperX to hold the de-route information, the address of the destination router, the address of the PE (e.g., the PE attached to the destination router) that will receive the data packet, a check sum field, Cyclic Redundancy Check (CRC) field, or some other suitable information used in the routing of a data packet. Operation 902 is shown that generates the data packet by associating the packet header and the packet load. Operation 902 is shown that generates the data packet by associating the packet header and the packet load.

Figure 10:
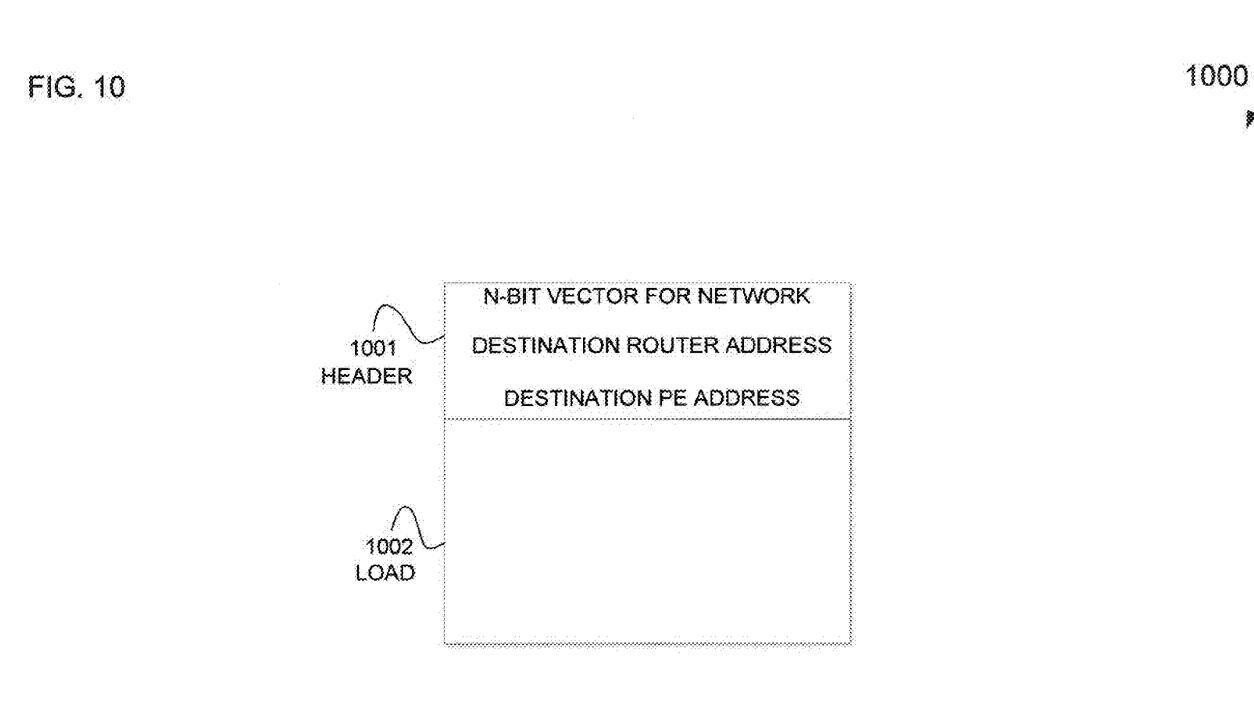
FIG. 10 is a diagram of a data packet, according to an example embodiment.

FIG. 10 is a diagram of a data packet 1000. Shown is a data packet 1000 that includes a header 1001 and a load 1002. The header 1001 may include fields for an N-bit vector value (e.g., a true or false bit value(s)), a destination router address, that address of the destination PE, and other suitable information.

In some example embodiments, a removable physical storage medium (i.e., memory) is shown to be a single medium, and the term "machine-readable medium" should be taken to include a single medium or multiple medium (e.g., a centralized or distributed database, and/or associated caches and servers) that store one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the method illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations there from. It is intended that the appended claims cover such modifications and variations as fall within the "true" spirit and scope of the invention.

What is claimed is:

1. A system comprising:
   a router having at least one processor to:
      receive a data packet, generated by a processing element, that is to be routed along a shortest path that includes a plurality of routers in a multiple dimension network;
      detect congestion of the shortest path;
      in response to detecting the congestion, determine whether performing a de-route would result in exceeding a threshold that specifies a number of de-routes that are allowed; and
      in response to determining that the threshold would not be exceeded, de-route the data packet from the shortest path to an additional path, where the additional path links the router and an additional router in a dimension of the multiple dimension network.

2. The computer system of claim 1, wherein the data packet includes a header that includes at least one selected from among an N-bit vector, a destination router address, or a processing element address.

3. The computer system of claim 1, wherein the multiple dimensional network is a HyperX network.

4. The computer system of claim 1, wherein the dimension of the multiple dimension network includes one path between every two distinct routers in the dimension.

5. The computer system of claim 1, wherein the determining determines whether performing the de-route would result in exceeding the threshold that specifies the number of de-routes that are allowed within the dimension.

6. A computer implemented method comprising:
   receiving a data packet, by a router of a plurality of routers, that is to be routed along a shortest path that includes the plurality of routers in a multiple dimension network; and
   in response to detecting congestion in the shortest path, determining whether performing a de-route would result in exceeding a threshold that defines a number of de-routes that can occur; and
   in response to determining that the threshold would not be exceeded, de-routing the data packet, using the router, from the shortest path to an additional path, where the additional path links the router and an additional router in a dimension of the multiple dimension network.

7. The computer implemented method of claim 6, further comprising de-routing the data packet, using the router, to the additional path that connects a source processing element and a destination processing element, where a time cost of de-routing the data packet to the additional path is less than a time cost of routing the data packet along the shortest path between the source processing element and destination processing element.

8. The computer implemented method of claim 6, further comprising transmitting the data packet, using the router, along the additional path from a source processing element to a destination processing element.

9. The computer implemented method of claim 6, wherein the threshold is based upon a consideration that includes at least one of livelock, deadlock, or computer system resource starvation.

10. The computer implemented method of claim 6, further comprising transmitting the data packet, using the router, along the shortest path from a source processing element to a destination processing element, in response to determining that performing the de-route would exceed the threshold.

11. The computer implemented method of claim 6, wherein the congestion of the shortest path includes at least one selected from among a broken link, a link whose bandwidth usage has exceeded a bandwidth threshold, or a blocked link.

12. A non-transitory machine-readable storage medium storing instructions that upon execution cause a router to:
   receive a data packet that is to be routed along a shortest path that includes a plurality of routers in a multiple dimension network;
   in response to detecting congestion in the shortest path, determine whether performing a de-route would result in exceeding a threshold that defines a number of de-routes that can occur; and
   in response to determining that the threshold would not be exceeded, de-route the data packet from the shortest path to an additional path, where the additional path links the router and an additional router in a dimension of the multiple dimension network.

13. The non-transitory machine-readable storage medium of claim 12, wherein the additional path connects a source processing element and a destination processing element, where a time cost of de-routing the data packet to the additional path is less than a time cost of routing the data packet along the shortest path between the source processing element and destination processing element.

14. The non-transitory machine-readable storage medium of claim 12, wherein the threshold is based upon a consideration that includes at least one selected from among livelock, deadlock, or computer system resource starvation.

15. The non-transitory machine-readable storage medium of claim 12, wherein the instructions upon execution cause the router to transmit the data packet along the shortest path from a source processing element to a destination processing element, in response to determining that performing the de-route would exceed the threshold.

16. The non-transitory machine-readable storage medium of claim 12, wherein the congestion of the shortest path includes at least one selected from among a broken link, a link whose bandwidth usage has exceeded a bandwidth threshold, or a blocked link.

17. The non-transitory machine-readable storage medium of claim 12, wherein the multiple dimensional network is a HyperX network.

18. The non-transitory machine-readable storage medium of claim 12, wherein the dimension of the multiple dimension network includes one path between every two distinct routers in the dimension.

19. The non-transitory machine-readable storage medium of claim 12, wherein the data packet includes a header that includes at least one of an N-bit vector, a destination router address, or a processing element address.

\* \* \* \* \*